United States Patent Office 3,627,465
Patented Dec. 14, 1971

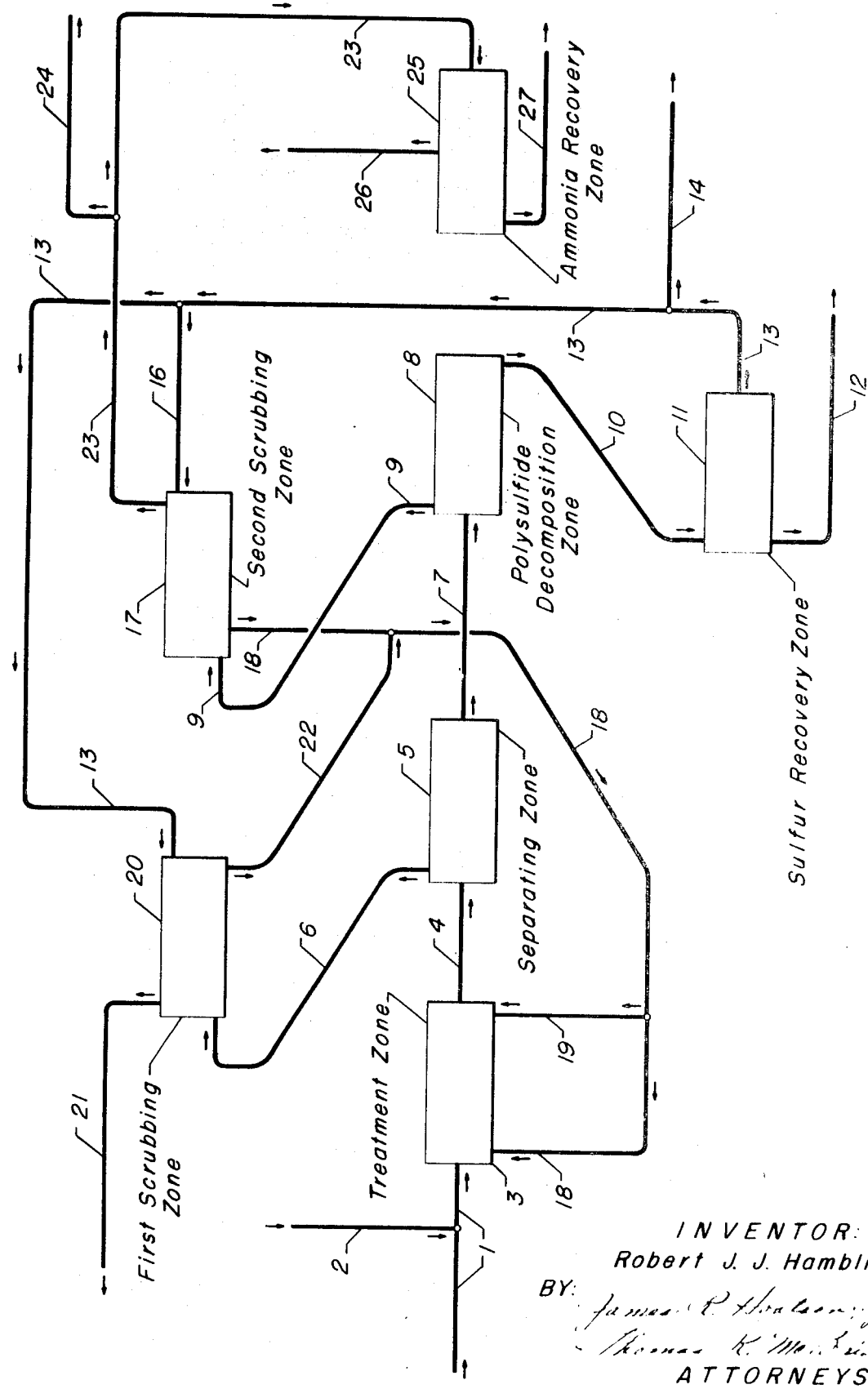

3,627,465
TREATMENT OF A WATER STREAM CONTAINING AN AMMONIUM SULFIDE SALT FOR THE PRODUCTION OF AMMONIA AND SULFUR
Robert J. J. Hamblin, Deerfield, Ill., assignor to Universal Oil Products Company, Des Plaines, Ill.
Filed Nov. 4, 1968, Ser. No. 773,211
Int. Cl. C01c 1/00; C01b 17/00, 21/00
U.S. Cl. 23—193                                           7 Claims

ABSTRACT OF THE DISCLOSURE

In the production of elemental sulfur and ammonia by the oxidation of waste water containing an ammonium sulfide salt in the presence of an oxidation catalyst, such as solid phthalocyanine catalyst, followed by decomposition of the resultant ammonium polysulfide, thereby forming aqueous ammonium thiosulfate, the continuous recycle to the oxidation step of an aqueous stream containing $(NH_4)_2S_2O_3$ in order to suppress side reactions leading to this product in the oxidation step.

The subject of the present invention is a process for the treatment of a water stream containing an ammonium sulfide salt in order to produce elemental sulfur and an ammonia-containing stream therefrom. More precisely, the present invention is concerned with a solution to the problem of the undesired production of ammonium thiosulfate as a side product that has heretofore plagued processes employing a solid catalyst and oxygen in order to oxidize ammonium sulfide salts to elemental sulfur.

The concept of the present invention developed from my efforts directed towards the solution of a substantial water pollution problem that is caused by the production of water streams containing ammonium sulfide salts as side products of a number of economically significant industrial processes in the chemical, petroleum, paper pulp, steel, and the like industries. For example, in the petroleum industry a water stream is used to remove ammonium hydrosulfide salts from the effluent equipment train associated with such hydrocarbon conversion processes as hydrorefining, hydrocracking, catalytic cracking, etc., in which ammonia and hydrogen sulfide side products are produced in the hydrocarbon conversion step. The original purpose for injecting the water stream into the effluent train of heat transfer equipment associated with these processes was to remove the ammonium hydrosulfide salts which, if not controlled, could clog-up the equipment.

Regardless of the source of the water stream containing ammonium sulfide salts, its disposal presents a substantial pollution hazard insofar as it contains sulfide which has a substantial biological oxygen demand and ammonia which is a nutrient that leads to excessive growth of stream vegetation.

One solution commonly used in the prior art to control the pollution problem caused by disposal of these water streams is to strip $NH_3$ and $H_2S$ from them and separately treat the resulting gas stream by techniques well known to those skilled in the art to recover ammonia and elemental sulfur. Another solution which has been used is to sufficiently dilute the water stream so that the concentration of sulfide salts is reduced to a level wherein it is relatively innocuous so that it can be discharged into a suitable sewer. Still another approach to the solution of this pollution problem has been directed towards a water treatment process which would allow recovery of the commercially valuable elemental sulfur and ammonia directly from this waste water stream by a controlled oxidation method. However, despite a careful and exhaustive investigation of alternative methods for direct oxidation of the sulfide salts contained in these water streams, it has been determined that an inevitable side product of the oxidation step appears to be ammonium thiosulfate. The presence of excessive amounts of ammonium thiosulfate in the treated aqueous stream presents a substantial problem not only because it decreases the yield of elemental sulfur but, more significantly, because it is frequently desired to produce a treated water stream that is substantially free of dissolved solids, particularly dissolved solids such as ammonium thiosulfate which contain nutrients and retain a residual biological oxygen demand. One of the principal reasons why it is desired to have the treated water stream contain a relatively low amount of dissolved solids is associated with the concept of reusing the treated water in the process which produced it. In many cases, the presence of large amounts of dissolved solids such as ammonium thiosulfate prevent the reuse of the treated water stream because these dissolved solids will precipitate out and cause problems. For example, in a hydrocracking or hydrorefining process where a water stream is used, as previously explained, in a water-contacting step to remove detrimental ammonium sulfide salts from the effluent stream from the hydrocarbon conversion step, it is desired to continuously recycle the treated water stream back to the process in order to remove additional quantities of the detrimental sulfide salts. The presence of excessive amounts of ammonium thiosulfate in this treated aqueous stream prevents the direct recycling of this stream back to the water-contacting step primarily because the ammonium thiosulfate can react with hydrogen sulfide contained in the effluent stream from the process to produce elemental sulfur, with resulting contamination of the hydrocarbon product stream with free sulfur. In sum, the problem addressed by the present invention is the production of ammonium thiosulfate as a side product in a treatment process employing a principal step involving the catalytic oxidation of sulfide salts contained in the water stream. The solution disclosed herein involves the continuous recycling of a stream containing ammonium thiosulfate to the oxidation step of the treatment process in order to control the production of ammonium thiosulfate, and hold the net make of ammonium thiosulfate to negligible levels. The solution disclosed herein is based on my finding that the ammonium thiosulfate-producing side reaction is equilibrium controlled, and, therefore, amenable to a suppression by a mass action effect.

It is, accordingly, one object of my invention to provide a process for treating a water stream containing an ammonium sulfide salt to produce elemental sulfur and ammonia while suppressing the net make of ammonium thiosulfate. Another object is to provide a process for treating a water stream containing ammonium sulfide salts to produce a treated water stream which has reduced biological oxygen demand. Another object is to increase the yield of elemental sulfur from a treatment process which catalytically oxidizes ammonium sulfide salts contained in an aqueous stream. Still another broad objective is to control a source of water pollution by chemical, petroleum, steel, and the like, industries.

In a broad embodiment, the present invention is a process for treating a water stream containing an ammonium sulfide salt to produce elemental sulfur and an ammonia-containing stream. In the first step of the process, the water stream, oxygen, and an aqueous recycle stream containing $(NH_4)_2S_2O_3$ are contacted with a solid catalyst at oxidizing conditions sufficient to form an aqueous effluent stream containing ammonium polysulfide, $(NH_4)_2S_2O_3$ and $NH_4OH$. The second step comprises subjecting the aqueous effluent stream from the first step to polysulfide decomposition conditions effective to produce an overhead vapor stream containing NH₃, H₂S, and H₂O, and a bottom aqueous stream containing elemental sulfur and $(NH_4)_2S_2O_3$. In the third step, an ammonia-containing stream is recovered from the overhead stream from the second step. Sulfur is separated from the aqueous bottom stream, in the fourth step, to form an aqueous stream containing $(NH_4)_2S_2O_3$. And the final step involves recycling at least a portion of the aqueous stream formed in the fourth step to the first step, thereby controlling the amount of $(NH_4)_2S_2O_3$ produced therein.

In a preferred embodiment, the present invention is a process for treating a water stream containing NH₄HS to produce elemental sulfur and an ammoniacal aqueous stream. In the first step of this process, the aqueous waste stream, an air stream, and an aqueous recycle stream containing $(NH_4)_2S_2O_3$, NH₄OH, and NH₄HS are contacted with a phthalocyanine catalyst at oxidizing conditions selected to form an effluent stream containing ammonium polysulfide $(NH_4)_2S_x$, $(NH_4)_2S_2O_3$, NH₄OH, H₂O, N₂, and unreacted NH₄HS. The effluent stream from the first step is then separated in the second step into a gas stream containing N₂, H₂O, H₂S, and NH₃, and a liquid water stream containing ammonium polysulfide, NH₄OH, NH₄HS, and $(NH_4)_2S_2O_3$. The third step comprises subjecting the liquid stream from the second step to polysulfide decomposition conditions effective to produce an overhead vapor stream containing NH₃, H₂S, and H₂O, and an aqueous bottom stream containing elemental sulfur and $$(NH_4)_2S_2O_3$$

Sulfur is then separated, in the fourth step, from the bottom stream from the third step to form an aqueous stream containing $(NH_4)_2S_2O_3$. In the fifth step, a first portion of the aqueous stream from the fourth step is contacted with the gas stream from the second step, in a first scrubbing zone, to form a nitrogen-rich gas stream which is vented from the system, and an aqueous effluent stream containing $(NH_4)_2S_2O_3$ and NH₄HS. In the sixth step, a second portion of the aqueous stream from the fourth step is contacted with the overhead vapor stream from the third step, in a scond scrubbing zone, to form a substantially sulfide-free overhead vapor stream containing NH₃ and H₂O and an aqueous effluent stream containing $(NH_4)_2S_2O_3$, NH₄OH, and NH₄HS. In the seventh step, the aqueous effluent streams from the fifth and sixth steps are combined, and the resulting combined stream is recycled to the first step. And the final step involves condensing the overhead vapor stream from the sixth step to form an ammoniacal aqueous product stream which is substantially free of NH₄HS and $(NH_4)_2S_2O_3$.

Other embodiments and objects of the present invention encompass details about particular input streams, output streams, and mechanics associated with each of the essential steps of the present invention, and are hereinafter disclosed in the following discussion of each of these steps.

As pointed out hereinbefore, the aqueous stream charged to the process of the present invention contains an ammonium sulfide salt. This salt can be either ammonium sulfide or ammonium hydrosulfide or a mixture thereof. When the ammonium sulfide salt is ammonium hydrosulfide, the process of the present invention is particularly effective, and in most applications the aqueous stream will contain this salt. The amount of the salt contained in the aqueous stream may vary over a wide range up to the solubility limit of the salt in water at the conditions utilized in the first step of the present invention. More frequently, the amount of sulfide salt will be sufficient to constitute about 1 to about 10 wt. percent calculated as elemental sulfur, of the aqueous waste stream. For example, a typical water stream recovered from a hydrocracking process contains about 2.3 wt. percent sulfur as NH₄HS. Typically, the water stream will contain excess amounts of NH₃ relative to the amount of H₂S absorbed therein, but very rarely will contain more H₂S than NH₃ because of the relatively low solubility of H₂S in an aqueous solution containing a ratio of dissolved H₂S to dissolved NH₃ greater than about 1:1.

According to the present invention, the water stream is passed to an oxidation step wherein it is catalytically treated in a treatment zone, with oxygen at oxidizing conditions selected to produce an aqueous effluent stream containing ammonium polysulfide, NH₄OH, and $(NH_4)_2S_2O_3$. In some cases, it is advantageous to remove dissolved or entrained oil contained in this water stream by means of any suitable settling or scrubbing operation, prior to passing this stream to this oxidation step; however, in most cases, this pretreatment procedure is not necessary and the water stream is charged directly to the oxidation step. An essential feature of the present invention is the commingling of the water stream feed with an aqueous recycle stream containing ammonium thiosulfate and, in the preferred case, unreacted sulfide recovered from the effluent stream from the oxidation step. This aqueous recycle stream may be commingled with the aqueous waste stream that is charged to this first step prior to its being passed into the treatment zone; on the other hand, this aqueous recycle stream can be injected into the treatment zone at a plurality of injection points spaced along the principal axis of flow of the aqueous stream through the treatment zone. The principal advantage of this latter procedure is that the recycle stream acts not only to control the ammonium thiosulfate production, but, in addition, can be utilized as a quench stream for the exothermic reactions taking place within the treatment zone. In the preferred case, where the aqueous recycle stream not only contains $(NH_4)_2S_2O_3$ but also sulfide recovered from the effluent from the oxidation step, an auxiliary advantage associated with this procedue is that the concentration of NH₄HS charged to the oxidation step can be increased. Since it has been determined that the selectivity of the oxidation reaction for elemental sulfur increases with the concentration of sulfide charged to the oxidation step, the presence of sulfide in the recycle stream can be used to increase the selectivity for sulfur of the oxidation step.

The catalyst utilized in the oxidation step is any suitable solid catalyst that is capable of effecting substantially complete conversion of the ammonium sulfide salt contained in the water stream. Two particularly preferred classes of catalyst for this step are metallic sulfides, particularly iron group metallic sulfides, and metal phthalocyanine. The preferred metallic sulfide catalyst is selected from the group consisting of the sulfides of nickel, cobalt, and iron, with nickel sulfide being especially preferred. Although it is possible to perform this oxidation step with a slurry of metallic sulfide particles, it is preferred that the metallic sulfide be combined with a suitable carrier material. Examples of suitable carrier materials are: charcoals, such as wood charcoal, bone charcoal, etc., which charcoals may or may not be activated prior to use; refractory inorganic oxides such as alumina, silica, zirconia, bauxite, etc.; activated carbons such as those commercially available under trade names of Norit, Nuchar, Darco, and other similar carbon materials familiar to those skilled in the art. In addition, other natural or synthetic highly porous inorganic carrier materials such as various forms of clay, kieselguhr, etc. may be used, if desired. The preferred carrier materials for the metallic sulfide catalyst are alumina, particularly alpha-, gamma-, theta-, and eta-alumina, and activated charcoal. Thus, nickel sulfide combined with alumina or nickel sulfide combined with activated carbon are particularly preferred catalysts for the oxidation step. In general, the metallic sulfide is preferably combined with the carrier material in amounts sufficient to result in a final composite containing about 0.1 to about 30 or more wt. percent of the metallic component, calculated as the elemental

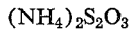

metal. For the preferred nickel sulfide catalyst, excellent results are obtained with about 1 to about 15 wt. percent nickel as nickel sulfide. Accordingly, examples of particularly preferred catalytic composites for use in the oxidation step are: about 1 to about 15 wt. percent nickel as nickel sulfide on an activated carbon support or on an alumina support.

An especially preferred catalyst for use in the oxidation step is a metal phthalocyanine catalyst combined with a suitable carrier material. Particularly preferred metal phthalocyanine compounds include those of cobalt and vanadium. Other metal phthalocyanine compounds that may be used include those of iron, nickel, copper, molybdenum, manganese, tungsten, and the like. Moreover, any suitable derivative of the metal phthalocyanine may be employed including the sulfonated derivatives and the carboxylated derivatives. Any of the carriers previously mentioned in connection with the metallic sulfide catalysts can be utilized with the phthalocyanine compound; however the, preferred carrier material is activated carbon. Hence, a particularly preferred catalyst for use in the oxidation step comprises a cobalt or vanadium phthalocyanine sulfonate combined with an activated carbon carrier material. Additional details as to alternative carrier materials, methods of preparation, and the preferred amounts of catalytic components are given in the teachings of U.S. Pat. No. 3,108,081 for these phthalocyanine catalysts.

Although the oxidation step can be performed according to any of the methods taught in the art for simultaneously contacting a liquid stream and a gas stream with a solid catalyst, the preferred system involves a fixed bed of the solid oxidizing catalyst disposed in a treatment zone. The water stream is then passed therethrough in either upward, radial, or downward flow and the oxygen stream is charged in either concurrent or countercurrent flow relative to the water stream. The preferred procedure is to operate in a downflow with both streams being charged in concurrent fashion. Because one of the products of this oxidation step is elemental sulfur, there is a substantially catalyst contamination problem caused by the deposition of this elemental sulfur on the fixed bed or the catalyst. In order to avoid sulfur deposition on the catalyst, it is an essential feature of the oxidation step that it is operated such that the net sulfur made in this step is reacted with excess sulfide to form a water-soluble polysulfide. That is to say, in order to prevent a deposition of sulfur on the catalyst bed with resulting deactivation of the catalyst, it is an essential feature of the present invention that the oxidation step is operated in a manner so that sufficient unreacted ammonium sulfide remains available to react with the sulfur produced in the primary oxidation reaction to form a water-soluble ammonium polysulfide.

In order to effect the polysulfide formation within the oxidation step, the amount of oxygen injected into the treatment zone must be carefully regulated so that oxygen is reacted in amounts less than the stoichometric amount required to oxidize all of the ammonium sulfide salt charged to this step to elemental sulfur. Since the stoichiometric amount of oxygen is 0.50 mol of oxygen per mol of sulfide, it is an essential feature of the present invention that the oxygen charged to the oxidation step is an amount sufficient to react less than 0.50 mol of $O_2$ per mol of sulfide, and, preferably, about 0.25 to about 0.45 mol of oxygen per mol of sulfide salt. It is especially preferred to operate the oxidation step with an amount of oxygen sufficient to react about 0.4 mol of oxygen per mol of the sulfide charged to this step. Accordingly, the amount of oxygen charged to the oxidation step is selected such that sufficient sulfide remains available to react with the net sulfur production—that is, sufficient excess sulfide is available to form a water-soluble ammonium polysulfide with the elemental sulfur which is the product of the primary oxidation reaction. Since 1 mol of sulfide will react with many atoms of sulfur (it is typically about 4 atoms of sulfur per mol of sulfide), it is generally only necessary that a small amount of sulfide remain unoxidized.

An essential reactant for this oxidation step is oxygen. This may be present in any suitable form, either by itself or mixed with other inert gases. In general, it is preferred to utilize air to supply the necessary oxygen, although substantially purer oxygen can be utilized, if desired. It is understood, of course, that the total amount of oxygen utilized in the oxidation step includes not only the amount present in a gas phase dispersed in the water stream, but the amount that is soluble in the water stream at the conditions utilized in the oxidation step, and the limitations hereinbefore given with respect to the amount of oxygen reacted in the oxidation step apply to free oxygen entering the treatment zone in any manner. Similarly, the amounts of oxygen utilized are calculated with reference to the total amount of sulfide charged to the oxidation step. This obviously includes any sulfide that is present in the aqueous recycle stream.

Regarding the conditions utilized in the oxidation step, it is preferred to utilize a temperature in the range of about 30 to about 400° F., with a temperature of about 80 to about 300° F. yielding best results. The sulfide oxidation reaction is not too sensitive to pressure, and, accordingly, any pressure which maintains the water stream substantially in the liquid phase may be utilized. In general, it is preferred to operate at the lowest possible pressure which is sufficient to maintain the elemental sulfur in combination as the water-soluble polysulfide, and pressures of about 1 to about 75 p.s.i.g. are particularly preferred. Additionally, it is preferred to operate on the basis of a combined stream liquid hourly space velocity which is defined as the volume charge rate per hour of the water stream feed plus the aqueous recycle stream divided by a total volume of the catalyst bed; and which is preferably selected from the range of about 0.6 to about 20.0 hr.$^{-1}$, with the value of about 1 to about 5 hr.$^{-1}$ giving best results.

Following the oxidation step, an aqueous effluent stream containing ammonium polysulfide, $(NH_4)_2S_2O_3$, $NH_4OH$, and a minor amount of other oxides of sulfur is withdrawn from the oxidation step and passed to a polysulfide decomposition step. Except in the case where the oxidation step is operated to react about 0.4 to 0.5 mol of $O_2$ per mol of sulfide, this stream will also contain unreacted $NH_4HS$. In the decomposition step this stream is subjected to conditions resulting in the decomposition of the polysulfide compound to yield a vapor stream containing $NH_3$, $H_2S$, and $H_2O$ and an aqueous bottom stream containing elemental sulfur and $$(NH_4)_2S_2O_3$$

Although the polysulfide can be decomposed according to any of the methods taught in the art, the preferred procedure involves subjecting it to conditions including a temperature in the range of about 100° F. to about 350° F. sufficient to form an overhead vapor stream containing $NH_3$, $H_2S$, $H_2O$, and a bottom aqueous stream containing elemental sulfur in admixture with an aqueous stream comprising 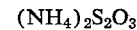 $(NH_4)_2S_2O_3$. In many cases, it is advantageous to accelerate the polysulfide decomposition reaction by stripping $H_2S$ and other gases from the polysulfide solution with the aid of a suitable inert gas such as steam, nitrogen, air, flue gas, etc. which can be injected into the bottom of the decomposition zone. Moreover, heat may be supplied to the bottom of the zone by means such as a steam coil or reboiler in order to accelerate the decomposition reaction. When the temperature utilized in the bottom of the decomposition zone is less than the melting point of sulfur, the elemental sulfur will be present in the form of a slurry of solid particles in the aqueous bottom stream. This slurry-containing stream is then subjected, in a sulfur separation step, to any of the techniques taught in the art for removing a solid from a liquid such as filtration, settling, centrifuging, etc. to remove the elemental sulfur therefrom and to form an aqueous stream containing $$(NH_4)_2S_2O_3$$

In the case where the decomposition temperature utilized is greater than the melting point of sulfur, the bottom stream will contain a dispersion of liquid sulfur in the aqueous stream, and this mixture can be passed to a suitable separation step wherein the liquid sulfur can be allowed to settle out and form a separate liquid sulfur phase. In this last case, the separation of the elemental sulfur from the aqueous recycle stream can be performed, if desired, within the decomposition zone by allowing the liquid sulfur to collect at the bottom of this zone, and separately drawing off the aqueous stream and a liquid sulfur stream. This last mode of operation is facilitated by the relatively rapid rate that liquid sulfur will separate from the water stream. Regardless of how the sulfur is separated, an aqueous stream containing a minor amount of $(NH_4)_2S_2O_3$ is recovered from this sulfur separation step.

Turning to the overhead vapor stream from the polysulfide decomposition step, this stream can then be subjected to a suitable distillation or scrubbing operation to porduce an ammoniacal, aqueous overhead stream and a bottom stream containing ammonium hydrosulfide, and, in most cases, ammonium hydroxide, which can be recycled to the oxidation step, if desired, for the purpose of increasing the net sulfur yield for this system. The ammoniacal aqueous overhead stream may then be further processed by a conventional distillation method to produce an ammonia concentrate and a treated water product stream.

It is an essential feature of the present invention that at least a portion of the aqueous stream containing ammonium thiosulfate recovered from the sulfur separation step is recycled to the oxidation step. In the cases where a minor amount of dissolved solids can be tolerated in the treated water stream produced by the present process, a portion of this stream can constitute a product stream. In the case where a minor amount of dissolved solids cannot be tolerated in the treated water product stream, the entire amount of this stream can be recycled to the oxidation step with the net amount of water charged to the system being taken overhead in the polysulfide decomposition zone and recovered in the aqueous ammoniacal product stream produced therefrom or a portion of this aqueous stream can be subjected to an evaporation step to produce a substantially thiosulfate and sulfide-free overhead stream. In the intermediate case, where the amount of dissolved solids in this aqueous stream is too high to meet requirements for the treated water product stream, a portion of this aqueous stream can be evaporated to produce a substantially thiosulfate-free water stream which then can be commingled with another portion of this thiosulfate-containing stream to reduce the dissolved solid content of the resutling combined stream to the desired level. Generally, good results are obtained when the entire amount of the aqueous stream containing $(NH_4)_2S_2O_3$ is recycled to the oxidation step.

The amount of thiosulfate salt contained in this recycle stream can be allowed to build up to a concentration sufficient to substantially suppress thiosulfate formation in the oxidation step. That is, when the entire aqueous stream recovered from the sulfur separation step is recycled, the amount of thiosulfate in this recycle stream will build up during the course of the process until an equilibrium level is reached at which point the net thiosulfate make will be approximately zero. If, for some reason, it is desired to maintain the amount of thiosulfate salt below this equilibrium value, a drag stream sufficient to reduce the concentration of thiosulfate to the desired level can be withdrawn from this aqueous recycle stream, as explained above. However, the preferred procedure is to allow the concentration of ammonium thiosulfate to build to an equilibrium level in this recycle stream.

Having broadly characterized the essential steps comprising the process of the present invention, reference is now had to the attached drawing for a detailed explanation of an example of a preferred flow scheme employed therein. The attached drawing is merely intended as a general representation of a preferred flow scheme with no intent to give details about vessels, heaters, condensers, pumps, compressors, valves, process control equipment, etc., except where knowledge of these devices is essential to an understanding of the present invention or would not be self-evident to one skilled in the art. In addition, in order to provide a working example of a preferred mode of the present invention, the attached drawing is discussed with reference to a particularly preferred mode of operation of each of the steps of the present invention. Moreover, it is understood that the description given in conjunction with the discussion of the attached drawing refers to a treating process that has been started up and is producing an aqueous recycle stream containing ammonium thiosulfate which is being recycled to the oxidation step.

Referring now to the attached drawing, a water stream containing about 5 wt. percent sulfur as ammonium hydrosulfide enters the process through line 1 and is commingled with an air stream at the junction of line 2 with line 1. The resulting mixture is heated in a suitable heating means, not shown, to a temperature of about 140° F. and passed into treatment zone 3. The amount of oxygen contained in the air stream entering the process through line 2 is sufficient to react about 0.4 mol of oxygen per mol of sulfide charged to treatment zone 3. This includes not only the sulfide present in the water stream entering the treatment via line 1, but also the sulfide that is contained in the aqueous recycle stream entering the treatment zone through lines 18 and 19. The total amount of ammonium hydrosulfide contained in the water stream plus the recycle stream is equivalent to about 6 wt. percent sulfur as ammonium hydrosulfide on a combined stream basis. Moreover, the aqueous recycle stream, entering treatment zone 3 via line 18 and 19, is at a temperature of about 120° F. and is injected at two separate injection points spaced along the axis of flow of the water stream through treatment zone 3, thereby providing quench streams for the exothermic reaction taking place within treatment zone 3. Despite the fact that only two injection points are shown in the attached drawing, in many cases it is advantageous to use a plurality of injection points spaced along this axis by methods well known to those skilled in the art to carefully control the temperature rise observed across treatment zone 3. Alternately, the recycle stream or a portion thereof may be commingled with air and fed to the front of treatment zone 3. In such case the fresh feed or a portion thereof may be fed at some intermediate point or points in the treatment zone. Furthermore, the aqueous recycle stream injected via line 18 and 19 contains ammonium thiosulfate which, as explained hereinbefore, serve to control thiosulfate production within treatment zone 3. The amount of ammonium thiosulfate entering the treatment zone via this recycle stream is equivalent to about 0.1 to about 5 wt. perecent or more sulfur on a combined stream basis; the exact value within this range being dependent upon the exact conditions utilized within the treatment zone 3 coupled with the amount of a drag stream withdrawn via line 14 from this aqueous recycle stream, as will be explained below. The aqueous recycle stream will also contain $NH_4OH$ resulting from the operation of scrubbing zone 17 as hereinafter explained.

The treatment zone 3 contains a fixed bed of a solid catalyst comprising cobalt phthalocyanine mono-sulfonate combined with an activated carbon carrier material in an amount such that the catalyst contains 1.0 wt. percent of the phthalocyanine component. The activated carbon granules used as the carrier material are in a size of of 10–30 mesh. The mixture of the fresh feed stream, the aqueous recycle stream, and the gas stream flow through the bed of catalyst in downflow fashion. The conditions utilized in the zone 3 are: a temperature of about 140° F. at the inlet to this zone, an outlet temperature of about 185° F., a pressure of about 5 p.s.i.g. and a liquid hourly space velocity based on the total volume of the combined water stream feed and aqueous recycle stream of about 2.0 hrs.$^{-1}$.

Following the oxidation step, an effluent stream is withdrawn from zone 3 via line 4 and passed to separating zone 5. This effluent stream contains ammonium polysulfide, $NH_4OH$. $(NH_4)_2S_2O_3$. $H_2O$, $N_2$, and unreacted $NH_4HS$. In a separating zone 5 a gas stream comprising nitrogen, $H_2O$, $NH_3$, and $H_2S$, is separated from a liquid water stream containing ammonium polysulfide, $NH_4HS$, $NH_4OH$, and $(NH_4)_2S_2O_3$. The gas stream leaves separating zone 5 via line 6, and the liquid stream leaves via line 7.

The liquid stream from separating zone 5 is charged via line 7 to polysulfide decomposition zone 8. In this case polysulfide decomposition zone 8 is a stripping column containing suitable gas liquid contacting means such as fractionating plates, baffles, or other suitable contacting means. Heat is supplied to the bottom of this stripper column by means such as a steam coil or reboiler near the bottom of the tower. In zone 8, the liquid stream is heated to a temperature of about 280° F. at a pressure of about 40 p.s.i.g. which is sufficient to produce an overhead vapor stream containing $NH_3$, $H_2S$, and $H_2O$ which is withdrawn via line 9, and a bottom stream containing liquid sulfur dispersed in an aqueous solution of ammonium thiosulfate which is withdrawn from zone 8 via line 10. Essentially all of the $NH_3$ contained in the input stream to zone 8 is recovered in the overhead vapor stream.

The bottom stream from the polysulfide decomposition zone is withdrawn via line 10 at a rate which is sufficient to prevent the liquid sulfur from collecting at the bottom of zone 8. The resulting stream is passed to sulfur recovery zone 11, which in this case is a settling zone wherein the liquid sulfur separates from an aqueous phase. In many cases, the flow parameter within zone 8 can be adjusted such that the separation of the liquid sulfur can occur in the bottom regions of this zone, if desired; however, here the separation is performed in a separate settling zone. The liquid sulfur that separates in sulfur recovery zone 11 is withdrawn from the system via line 12. The aqueous phase containing ammonium thiosulfate is withdrawn from zone 11 via line 13, and a portion thereof can be withdrawn from the system via line 14 in order to remove at least a portion of the net water charged to the system, as previously explained, if the amount of thiosulfate salt contained therein can be tolerated in the treated water product stream from this process. In addition, the amount of water stream withdrawn via line 14 can serve to regulate the amount of ammonium thiosulfate recycled to the treatment zone 3, if desired. In another mode of operation, the aqueous stream withdrawn via line 14 can be subjected to a suitable evaporation step to produce a substantially pure water stream as overhead and an enriched ammonium thiosulfate bottom stream which can then be recycled to treatment zone 3, if desired, or evaporated to dryness to produce ammonium thiosulfate crystals which then can be utilized in any manner known to those skilled in the art.

The remaining portion of the aqueous stream withdrawn from the sulfur recovery zone 11 is passed via line 13 to the junction of line 16 with line 13 where it, in turn, is divided into two additional portions, the first portion continuing on via line 13 to first scrubbing zone 20 and the second portion being charged via line 16 to second scrubbing zone 17. In zone 20, a portion of the aqueous stream withdrawn from zone 11 is countercurrently contacted with the gas stream withdrawn from zone 5 via line 6 in a suitable scrubbing column containing contacting means. Zone 20 is preferably operated at a relatively low temperature and a pressure corresponding to the pressure in the separating zone 5. Normally, intimate contact between the gas stream and the liquid stream is effected in a vertically positioned tower at a gas to liquid loading which is sufficient to produce a nitrogen-rich gas stream which exits from the tower near the top thereof via line 21, and an aqueous effluent stream containing ammonium thiosulfate and ammonium hydrosulfide which is withdrawn near the bottom of the tower via line 22. The aqueous stream withdrawn via line 22 contains substantially all of the hydrogen sulfide and ammonia which was flashed off in separating zone 5.

In the second scrubbing zone, zone 17, another portion of the aqueous stream recovered from zone 11 is countercurrently contacted with the overhead vapor stream from polysulfide decomposition zone 8 which is charged to the lower region of zone 17 via line 9. Zone 17 is operated at a pressure of about 35 p.s.i.g., and a temperature of about 270° F., and a liquid to gas loading sufficient to produce an overhead stream containing $NH_3$ and $H_2O$ which is substantially free of sulfide, and an aqueous bottom stream containing $(NH_4)_2S_2O_3$, $NH_4OH$, and $NH_4HS$. The overhead vapor stream is withdrawn from zone 17 via line 23, condensed to form an ammoniacal aqueous stream, and the resulting liquid stream passed to ammonia recovery zone 25. If desired, an ammoniacal aqueous product stream can be withdrawn from the system via line 24. Ammonia recovery zone 25 is a stripping zone wherein an ammonia-rich stream is stripped from an aqueous stream to produce an ammonia concentrate which is recovered via line 26 and a substantially sulfide-free and ammonia-free treated water product stream which is recovered via line 27. The conditions utilized within ammonia recovery zone 25 are well known to those skilled in the art and will not be repeated here.

Returning to the bottom streams from zone 20 and zone 17, these streams are combined at the junction of line 22 with line 18 and the resulting mixture cooled by a suitable cooling means not shown. The resulting cooled mixture is passed via line 18 and line 19 back to treatment zone 3 as previously explained. The purpose of the two scrubbing operations is to recapture the unreacted sulfide contained in the effluent from the oxidation step in order to prevent pollution problems that could be caused by the disposal of this unreacted sulfide, and to increase the yield of elemental sulfur recovered via line 12.

Accordingly, the principal effect of the aqueous recycle stream being charged to treatment zone 3 is to control the production of thiosulfate in the system, and, the process is operated in the manner indicated for a substantial period of time, and it is determined that this procedure is an effective and economic way to solve the problem of production of ammonium thiosulfate as a side product in the oxidation step.

I claim as my invention:
1. A process for treating a water stream containing $NH_4HS$ to produce elemental sulfur, and an ammoniacal aqueous stream, said process comprising the steps of:
  (a) contacting the water stream, an air stream and an aqueous recycle stream containing $(NH_4)_2S_2O_3$, $NH_4OH$, and $NH_4HS$ with a solid oxidation catalyst at oxidizing conditions selected to form an effluent stream containing ammonium polysulfide,

$$(NH_4)_2S_2O_3$$

$NH_4OH$, $H_2O$, and $N_2$, and unreacted $NH_4HS$;
  (b) separating the effluent stream from step (a) into a gas stream containing $N_2$, $H_2O$, $H_2S$ and $NH_3$ and a liquid water stream containing ammonium polysulfide, $NH_4OH$, $NH_4HS$, and $(NH_4)_2S_2O_3$;

(c) subjecting the liquid stream from step (b) to polysulfide decomposition conditions effective to produce an overhead vapor stream containing $NH_3$, $H_2S$, and $H_2O$ and an aqueous bottom stream containing elemental sulfur and $(NH_4)_2S_2O_3$;

(d) separating sulfur from the bottom stream from step (c) to form an aqueous stream containing $(NH_4)_2S_2O_3$;

(e) contacting a first portion of the aqueous stream from step (d) with the gas stream from step (b), in a first scrubbing zone, to form a nitrogen-rich gas stream and an aqueous effluent stream containing $(NH_4)_2S_2O_3$ and $NH_4HS$;

(f) contacting a second portion of the aqueous stream from step (d) with the overhead vapor stream from step (c), in a second scrubbing zone, to form a substantially sulfide-free overhead vapor stream containing $NH_3$ and $H_2O$ and an aqueous effluent stream containing $(NH_4)_2S_2O_3$, $NH_4HS$, and $NH_4OH$;

(g) combining the aqueous effluent stream from step (e) and that from step (f) and recycling the resulting combined stream to step (a); and, (h) condensing the overhead vapor stream from step (f) to form an ammoniacal aqueous product stream which is substantially free of $NH_4HS$ and $(NH_4)_2S_2O_3$.

2. A process as defined in claim 1 wherein the solid catalyst is a phthalocyanine catalyst.

3. A process as defined in claim 1 wherein the solid catalyst comprises an iron group metallic sulfide combined with a carrier material.

4. A process as defined in claim 1 wherein the amount of air charged to step (a) is sufficient to react about 0.4 mol of oxygen per mol of sulfide charged to said step.

5. A process as defined in claim 1 wherein the oxidizing conditions utilized in step (a) include a temperature of about 80 to about 300° F., a pressure of about 1 to about 75 p.s.i.g. and a combined stream liquid hourly space velocity of about 0.6 to about 20.0 hr.$^{-1}$.

6. A process as defined in claim 1 wherein said catalyst is cobalt phthalocyanine monosulfonate combined with an activated carbon carrier material.

7. A process as defined in claim 1 wherein said air stream is charged to step (a) in an amount sufficient to react about 0.25 to about 0.45 mol of $O_2$ per mol of $NH_4HS$ charged to said step.

References Cited

UNITED STATES PATENTS

| | | | |
|---|---|---|---|
| 3,108,081 | 10/1963 | Gleim et al. | 252—428 |
| 3,457,046 | 7/1969 | Hoekstra | 23—224 |
| 3,536,618 | 10/1970 | Urban et al. | 23—193 |
| 3,536,619 | 10/1970 | Urban et al. | 23—193 |
| 3,558,272 | 1/1971 | Urban | 23—224 |

OSCAR R. VERTIZ, Primary Examiner

H. S. MILLER, Assistant Examiner

U.S. Cl. X.R.

23—220, 224; 210—63